Figure 1:
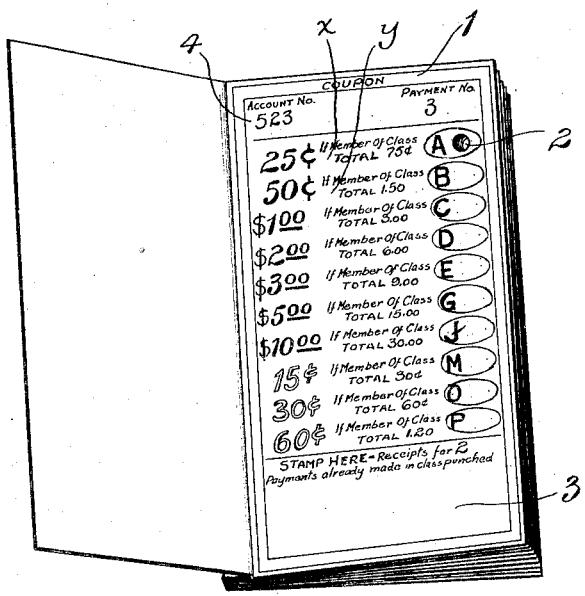

April 10, 1928.

W. H. WILKES

COUPON BANK DEPOSIT BOOK

Filed Jan. 31, 1925

1,665,574

INVENTOR
WILLIAM H. WILKES.

BY *Bakewell & [illegible]*

ATTORNEYS.

Patented Apr. 10, 1928.

1,665,574

UNITED STATES PATENT OFFICE.

WILLIAM H. WILKES, OF NEW YORK, N. Y., ASSIGNOR TO NATIONAL ADVERTISING CORPORATION, OF ST. LOUIS, MISSOURI, A CORPORATION OF MISSOURI.

COUPON BANK DEPOSIT BOOK.

Application filed January 31, 1925. Serial No. 6,029.

This invention relates to deposit books or payment books of the kind that are used by business institutions to facilitate the payment to the institution of definite amounts which the customers of the institution have agreed or are expected to pay, usually at stated intervals or within a specified period of time. Books of the kind referred to are now used extensively by banking institutions in connection with savings accounts of the kind generally referred to as "savings clubs", but they are applicable to other kinds of banking accounts and to the business conducted by other kinds of institutions, such as building and loan companies, and even retail stores. In view of the fact that the principal use of such books at the present time is in connection with "savings clubs", I have herein illustrated my invention embodied in a bank deposit book for savings clubs, but I wish it to be understood that the invention is not restricted to this particular use.

The primary object of savings clubs is to induce persons to save money for a particular purpose, for example, for a Christmas fund, or for a vacation fund, by depositing a certain amount in a savings account at stated intervals, usually each week or each month of a year. The general custom of banking institutions which operate savings clubs is to divide the depositors into a number of different classes or clubs which differ from each other in the amounts of the weekly or monthly deposits. For example, one class or club, which, for convenience, will be termed class A, will be composed of depositors who agree to make weekly or monthly deposits of 25¢; another class, referred to as class B, will be composed of depositors who agree to make weekly or monthly deposits of 50¢, etc. In some instances a banking institution may have as many as ten different classes of depositors who are making deposits at stated intervals under the club plan and the amounts of the weekly deposits of the respective club members may be definite amounts that remain the same throughout the entire period, or they may be variable amounts which progressively increase or decrease.

"Savings clubs" afford but rarely a direct net profit to the operating banks; more often, a net loss. Their value lies in indirect results. The club is an advertising plan, a business-building scheme. It brings into banks people who, properly influenced, become regular and substantial savers, thus developing into patrons for every department of service the bank offers. The banker having a club desires, therefore, first, that his club system be one which, to his bank, is economical in cost and operation; secondly, that his club system be one that will impress club members with the speed and accuracy of the bank's service; and, thirdly, that it embody ideas which, by suggestion, will lead the club member from small to more substantial undertakings in thrift. How well these requirements of the banker are met by my invention will be demonstrated in succeeding paragraphs.

Two different types or kinds of deposit books are now in general use by banking institutions for facilitating the depositing and recording of deposits of the members of savings clubs of the kind previously referred to. In one of said types, commonly referred to as the pass book type, the amounts which a club member is expected to pay and the dates when said amounts are due are printed in the book in proximity to spaces in which the official of the bank who receives the deposits places marks when the deposits are made so as to make the book serve as a receipt for the holder which shows the total amount of his deposits. The pass book provides a method of receipting for payments in a book held by the member, but the records kept by the bank are simply memoranda made by the clerk handling the transaction, and accordingly, subject to error in high degree. Much time is consumed in handling the transactions at the window, too. In the other type, which I will refer to as the single class coupon book, the book comprises or is made up of a plurality of detachable coupons corresponding in number to the weekly or monthly payments and each having printed thereon the particular amount of the weekly or monthly deposit to be made by the holder of that particular book and a date that represents the time at which the holder of the book is expected to deposit the amount specified on the coupon. These coupons are extracted by the bank official, one after the other, as the deposits are made by the holder of the book and are used similarly to a conventional deposit slip in the operation of recording the deposits of the holder of the book. Such a coupon book provides a deposit ticket already made out to show the amount of the deposit, as well as the account number of the member. It is fast at the window and more accurate than a pass book. On the other hand, it does not keep before the club member the suggestion of larger savings, as is done in a pass book having provision for all classes. Moreover, the bank must conjecture in advance how many books of the respective classes to order; it may run out of one class, or have too many of one class. Nor can it keep all the accounts in numerical sequence, for the books of each class are numbered sequentially, and permit no more than intraclass numerical sequence.

My invention relates to a bank deposit book of the coupon type which is distinguished from the conventional single class coupon book, in that it is capable of use for any one of the various classes of depositors or svaings clubs operated by a banking institution.

The object of my invention is to provide an all-classes-coupon book which has the following desirable characteristics:

1st. It provides a deposit ticket already made out, just as does the ordinary single class coupon book.

2nd. It provides a rapid and accurate method of handling accounts at the receiving teller's window just as does the ordinary single class coupon book.

3rd. It eliminates the possibility of the banking institution having on hand too many books for depositors of a certain class and not having a sufficient supply of books for depositors of a certain class, due, of course, to the fact that it is capable of appropriation to any class.

4th. It permits all of the club accounts to be run straight through in numerical sequence.

5th. It tends to instill thrift in the holder, in that it constantly suggests to the holder to "save more".

6th. It enables the institution that uses the book to obtain minimum prices in buying club supplies, due to the fact that one form of book serves for all clubs or classes of depositors, and it eliminates the possibility of the institution buying an over supply or an insufficient supply for a certain class.

7th. Due to the fact that one printed coupon form serves for all classes, the manufacturer of the book can produce a more durable and attractive coupon and coupon book for the same money than could be produced if the manufacturer were required to print a dozen or so different forms of coupons.

8th. It permits a depositor who is a member of several different clubs to use one book in connection with all of said clubs, thereby effecting some saving in the number of books furnished by the institution and obviating the need of the depositor carrying or looking after several books.

9th. It reduces the work of obtaining members to the various "savings clubs" operated by a bank, in that the bank can give a book to a prospective club member who can look over the book and select the particular club which he desires to join. This method of obtaining members is extremely effective, and cannot be practiced at all when only one class of coupon is in a book, for then the class in the book sent to each person might not be the desired or suitable class.

10th. It is of such construction that the deposits of members of the various classes can be received and receipted for quickly and without liability of error on the part of the bank official who receives the deposits, notwithstanding the fact that the book has provision for a large number of classes of depositors.

11th. It overcomes the necessity of the bank official using a separate or different stamp in the operation of receipting for the deposits of the members of the various classes or clubs, thereby effecting a considerable saving in time to both the depositors and bank officials in receiving deposits and reducing to a minimum the liability of error on the part of the bank official in marking the coupons that are presented with deposits.

12th. It can be appropriated to a selected class at the time it is given to a club member or depositor by simply punching a hole or otherwise marking, in a single operation, all of the coupons in the book, thereby making it practicable for a bank official who receives the deposits to use the same stamp in receipting for the deposits of all classes that are received each day.

13th. It is constructed in such a manner that the operation of marking the book to appropriate it to a selected class does not mutilate, deface or obliterate the information on each coupon of the book pertaining to the other classes, and thus destroy the efficiency of the book as an advertising medium and as a means for promoting thrift by suggestion.

14th. It is compact, of neat and attractive appearance and of such design that the holder of the book will be able to ascertain at any time the weekly or monthly deposits contemplated for by the various classes or clubs operated by the bank and also the total amounts which the members of the respective classes or clubs will have on deposit at any time, if they fulfill their obligations, thereby tending to instill the saving habit in the holder of the book, by showing him what can be acquired by systematic saving and acting as an incentive for the holder to change from a lower to a higher class.

To this end I have devised a coupon bank deposit book that comprises a plurality of detachable coupons equipped with indicia representing different classes of depositors arranged so that corresponding indicia on the respective coupons that designate similar classes are disposed in alignment, whereby the book can be appropriated to any one of the various classes by placing a mark on each coupon at the point thereon where the indicia representing the selected class is located. It is immaterial, so far as my broad idea is concerned, what particular type or kind of mark is used on the coupons of the book to appropriate the book to a selected class of depositors, but the method that I prefer to use for restricting the book to a selected class is to punch holes simultaneously in all of the coupons of the book through corresponding portions of the coupons that contain indicia which represents or designates the selected class. For example, if the book has provision for ten different savings clubs or ten different classes of depositors, each coupon of the book will have printed or marked thereon indicia pertaining to said classes such as ten different letters, symbols or characters that designate the respective classes and ten different numbers or symbols representing the amounts to be paid by the members of the various classes or clubs. The indicia on each coupon representing the different classes are arranged transversely of the coupon in parallel relation and the coupons that make up the complete book are superimposed one upon the other so as to cause corresponding indicia on the respective coupons that designate similar classes to be disposed in alignment with each other. Accordingly when the book is presented to a depositor the book can be appropriated to the particular class or club selected by the depositor by forcing a punch through all of the coupons to pierce or form a hole in the aligned portions of the coupons that contain the indicia which represents or designates the class selected by the prospective depositor to whom the book is given.

In addition to the data above referred to each coupon of the book is also provided with a symbol or character, usually a number, that designates the holder of the book, and it is also provided with a space in which the official of the bank who accepts a deposit can place a mark that serves as a receipt for all of the deposits previously made but not including the deposit to be subsequently presented with the coupon to which the receipt has just been affixed.

Figure 2:
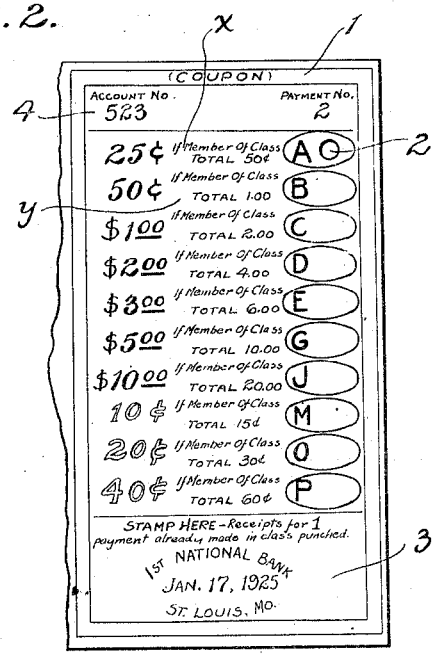

Figure 1 of the drawingss is a perspective view of a coupon bank deposit book embodying my invention, showing the first two coupons of the book removed; and Figure 2 is a top plan view of coupon No. 2 of the book that was detached by the bank official at the time the second deposit was made so as to facilitate the entry of said deposit in the records of the bank.

The book illustrated in the drawings is capable of use with ten different classes of depositors or ten different savings clubs, each of which contemplates fifty deposits or payments by the holder of the book during a certain period, for example, one year. The amounts or deposits which distinguish said classes from each other may either be definite amounts that remain fixed or unchanged throughout the saving period, or they may be variable amounts which progressively increase or decrease. For example, one class may be composed of depositors who agree to make fifty payments of 25¢ each; another class may be composed of depositors who agree to make fifty payments of $1.00 each, and another class may be composed of depositors who agree to make a first payment of 5¢, a second payment of 10¢, a third payment of 15¢, etc.

Any preferred or suitable indicia can be used for designating the respective classes of depositors, but I prefer to use the letter A to designate depositors of the lowest class, for example, those who agree to make payments of 25¢ each; use the letter B to designate the next higher class, etc. Accordingly, in the form of my invention herein illustrated each coupon 1 of the book will be provided with indicia $x$ comprising the amount 25¢ and the letter A to designate or represent one class of depositors, indicia $y$ comprising the amount 50¢, and the letter B representing a different class of depositors, and similar indicia representing other classes of depositors who agree to deposit certain amounts each week, month or other period. As shown in the drawings, the depositors in class M and also the depositors in classes O and P are expected to deposit variable amounts which increase progressively, beginning with the first payment or deposit of 5¢, in class M, and increasing 5¢ for each successive deposit.

The indicia $x$, $y$, etc. on each coupon representing different classes of depositors are arranged in parallel relation and are so disposed that the indicia $x$ on all of the coupons representing class A, will be located in alignment with each other, thereby making it possible to appropriate the book to a particular class, for example, class A, by punching a hole 2 through all of the coupons of the book in the aligned portions of the coupons that contain the indicia $x$, or notching the edges of said portions. While I have stated that a hole 2 is preferably punched in aligned superimposed portions of the coupons to restrict the book to a certain class of depositors, I wish it to be understood that it is immaterial, so far as my broad idea is concerned, what method is used to mark the coupons so as to appropriate the book to one of the various classes of depositors, so long as the coupons are marked at the time the book is issued to the book holder. Using a punch, however, is a highly desirable method of marking the coupons, as it is rapid and accurate.

At some suitable place on each of the coupons, preferably at the lower end of same, is a space 3 in which the official of the bank who receives the deposits can place a mark that serves as a receipt for all of the deposits previously made by the holder of the book. Usually this mark will consist of the name of the bank and the date on which the mark is placed on the space 3 of the coupon, the marking device that is generally used consisting of a conventional rubber stamp. I also prefer to provide each coupon with a character or symbol 4 common to all of the coupons of the book, that designates the holder of the book, the symbol 4, used in the book herein illustrated consisting of the number 523 arranged at the upper end of each coupon. The respective coupons are preferably numbered 1, 2, 3, etc. so as to indicate the particular payment or deposit to which each coupon corresponds, and in most instances, the indicia $x$, $y$, etc. on each coupon, in addition to comprising a letter and an amount representing the class and the sum to be deposited, will also comprise information from which the holder of the book can easily ascertain the total sum of his previous deposits. For example, indicia $x$ of coupon No. 3 will comprise the word "Total", followed by the amount 75¢ to indicate that after coupon No. 3 has been presented to the bank, accompanied by a deposit of 25¢, the holder of the book will have 75¢ to his credit. As is usual in bank deposit books, the cover of the book, or some other suitable portion of the book, can be provided with spaces for receiving the name and address of the holder.

In using a coupon deposit book of the kind above described a prospective depositor, upon applying to a bank for membership in one of the savings clubs being operated by the bank, will advise the bank of the particular club or class of depositors which he desires to join and the bank will then give the depositor a book that has been appropriated to the particular club or class of depositors selected by the prospective depositor by punching a hole 1 through the aligned portions of the coupons of the book that contain indicia which represents the selected class. For example, if class A is selected, the bank official will punch a hole 2 in all of the coupons adjacent the letter A on each coupon and will then give the book to the depositor. When the first deposit becomes due the depositor will present the book, together with 25¢, to the teller of the bank who accepts deposits from the members of the savings clubs, and the teller will then detach coupon No. 1, and will retain the same for use in entering the deposit of the book holder on the records of the bank. Before returning the book to the depositor the teller stamps in the space 3 of coupon No. 2 a mark, such, for example, as the name of the bank and the date, that serves as a receipt for the first payment or deposit made by the book holder, the space 3 in which said stamp is placed being preferably provided with suitable indicia that designates what said stamp represents, for example—"Stamp here" "Receipts for 1 payment already made in class punched"—. Consequently, coupon No. 2 serves as a receipt to the depositor for the first payment and it also enables the book holder to ascertain, by examining the indicia $x$ on coupon No. 2, the amount he will have on deposit after he has made the second payment. When the second payment becomes due the book is again presented to the bank teller, together with 25¢, and after the teller has detached coupon No. 2 and stamped coupon No. 3 in the space marked 3, he will return the book to the holder.

From the foregoing it will be seen that my improved book has the same desirable characteristics as the conventional single class coupon book, in that it provides a deposit slip already made out and permits deposits to be handled rapidly and accurately by the receiving teller, and it also has many desirable characteristics not possessed by the single class coupon book. For example, it permits the banking institutions to use one form of book for all savings clubs operated by the bank, thus simplifying the distribution of books to prospective customers, simplifying the work of ordering and keeping track of the supply of books on hand and making it possible for the bank to obtain at a low cost a durable book that is of neat and attractive appearance. It also permits all of the club accounts to be run straight through in numerical sequence, and as the book contains full information in regard to all of the classes of depositors or all of the savings clubs, it tends, by suggestion, to make the holder of the book save more, thus forming a very efficient advertising medium for the bank. The above mentioned characteristics of my book, taken in connection with the other characteristics, specified in the statement of the objects of my invention, make my book a decided improvement on the various types, kinds and forms of deposit books and payment books heretofore used to facilitate the payment to an institution of definite amounts which the customers of the institution have agreed or are expected to pay.

Having thus described my invention, what I claim as new and desire to secure by Letters Patent is:

1. A bank deposit book comprising a plurality of detachable coupons, each of said coupons in the book being in superimposed relation with respect to all the other coupons in the book, indicia representing a number of different classes of depositors on said coupons, an indicated space on each coupon corresponding to each indicium thereon, the spaces of the different coupons being in substantially exact superimposed relation whereby all the coupons of the book may be punctured in a single operation in advance of issuance of the book, and said indicia being of such nature as to indicate that all the coupons of the book have been appropriated to a particular class of depositors when superimposed spaces throughout the book have been punctured.

2. A multi-class coupon bank deposit book comprising a plurality of detachable coupons, each of said coupons in the book being in superimposed relation with respect to all the other coupons in the book, indicia representing a number of different classes of depositors on each of said coupons, and superimposed openings in the coupons corresponding to the indicia designating the class to which the coupons are appropriated whereby the entire book is appropriated to that particular class of depositors represented by the indicia corresponding to the openings.

3. A multi-class coupon bank deposit book comprising a plurality of detachable coupons, each of said coupons in the book being in superimposed relation with respect to all the other coupons in the book, indicia representing a number of different classes of depositors on each of said coupons, an indicated space corresponding to each indicium on each of said coupons, the spaces of the separate coupons being in substantially exact superimposed relation throughout the book, and a puncture in the space of each coupon corresponding to the indicium designating the class to which the book is appropriated.

WILLIAM H. WILKES.